US011904285B2

(12) United States Patent
Zaouk et al.

(10) Patent No.: US 11,904,285 B2
(45) Date of Patent: Feb. 20, 2024

(54) COMPUTER-CONTROLLED SINGLE MANUFACTURING SYSTEM FOR GENERATING INDIVIDUALIZED MIXTURES

(71) Applicant: eSalon.com, LLC, Culver City, CA (US)

(72) Inventors: Rabih Zaouk, Los Angeles, CA (US); Erik Napoles, Torrance, CA (US)

(73) Assignee: eSalon.com, LLC, Culver City, CA (US)

( * ) Notice: Subject to any disclaimer, the term of this patent is extended or adjusted under 35 U.S.C. 154(b) by 325 days.

(21) Appl. No.: 17/486,525

(22) Filed: Sep. 27, 2021

(65) Prior Publication Data

US 2023/0094876 A1 Mar. 30, 2023

(51) Int. Cl.

*B01F 35/21* (2022.01)
*B01F 33/84* (2022.01)
*B01F 35/221* (2022.01)
*B01F 35/22* (2022.01)

(52) U.S. Cl.

CPC ........ *B01F 33/8442* (2022.01); *B01F 33/848* (2022.01); *B01F 35/2117* (2022.01); *B01F 35/2202* (2022.01); *B01F 35/2211* (2022.01); *B01F 35/2216* (2022.01)

(58) Field of Classification Search

CPC ................ B01F 33/8442; B01F 33/848; B01F 35/2117; B01F 35/2202; B01F 35/2211; B01F 35/2216

USPC .......................................................... 141/104

See application file for complete search history.

(56) References Cited

U.S. PATENT DOCUMENTS 5,027,869 A * 7/1991 Tsumura ................. B65B 43/56 198/774.1
7,997,448 B1 8/2011 Leyva
10,626,003 B2 * 4/2020 Wyatt .................. B67D 1/0037
2009/0218007 A1 * 9/2009 Saranow ................ G01G 17/04 141/104

FOREIGN PATENT DOCUMENTS

WO 2007053692 A1 5/2007

OTHER PUBLICATIONS

World Intellectual Property Organization, International Search Report and Written Opinion for International Application No. PCT/US22/44853, dated Jan. 27, 2023, 7 total pages.

* cited by examiner

*Primary Examiner* — Jason K Niesz
(74) *Attorney, Agent, or Firm* — SoCal IP Law Group LLP; Jonathan Pearce

(57) ABSTRACT

There is disclosed a computer-controlled dispenser system. The system includes a first set of repositories for fluid components suitable for combination into different mixtures, a second set of repositories for viscous components suitable for combination into different mixtures, and a dispensing nozzle where the fluid and viscous components are dispensed. The system further includes a set of valves and pumps for moving fluid and viscous components to a dispensing nozzle and a scale for measuring an amount of fluid and viscous components dispensed from the dispensing nozzle. The system enables computer control to ensure accurate output of both fluid and viscous components according to the instructions received for their creation.

20 Claims, 7 Drawing Sheets

COMPUTER-CONTROLLED SINGLE MANUFACTURING SYSTEM FOR GENERATING INDIVIDUALIZED MIXTURES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to fluid and viscous component manufacturing and more particularly to unique one-off manufacturing of complex components with various viscosities.

Description of the Related Art

Since the advent of assembly-line manufacturing, the vast majority of consumer products have been created on uniform assembly lines or other manufacturing lines that rely upon consistently churning out identical products, one after another. The benefits of mechanized manufacture have been rampant. The cost-per-unit has gone down, the necessity of hundreds or thousands of assembly-line workers has gradually reduced, and the overall quality and uniformity of products has increased over the last one hundred years or so.

One example is an automotive assembly line. Automotive assembly lines generally are tooled so as to repeatedly create a particular automobile and a particular model of that automobile many times per day over the course of often weeks of manufacturing. Even if only a different model (e.g. a 2-door vs a 4-door version of the same automobile) or sometimes even simply a different color is desired, the assembly line must be stopped and retooled for that different assembly. Modern manufacturers have worked to reduce this downtime, doing as much of the work as possible ahead of time, making associated robotics simple to swap out, and cross-training workers or having multiple lines in each plant, so that lines may be swapped out intermittently with always at least one line operating. However, even among these models, the result has been significant uniformity for the consumer.

Other products are very similar. Companies that manufacture dish soap create a formula or several formulas for that dish soap. The ingredients are placed within associated vats or holding chambers, then a computer controls how much of each ingredient enters a primary mixing chamber or vat. Thereafter, the ingredients are mixed, and one-by-one the resulting dish soap is dispensed until that vat is empty. The ingredients are set, the amounts of each are set, and the dispensing of the resulting mixture is, very intentionally, identical each time. If different dish soaps are desired, the ingredients are swapped out, but the system otherwise remains the same, churning out identical dish soap under the new ingredient list and dispensing identical mixtures to many receptacles.

The same holds true for virtually every other product created at any scale in modern manufacturing. Cosmetics, hair dyes, tires, electronic components, cups, clocks, shoes, paint, and other products all rely on automation for production at scale and rely upon the uniform creation of the same product over-and-over to decrease manufacturing costs, increase consistency across products and over time, and to ensure quality controls have a standard measure to match.

As a result of this automation, prices have generally gone down for many consumer products (e.g. televisions) relative to consumer income. But, humans have a desire for unique products that are special to them and them alone. This has resulted in the rise of interest in hand-made goods. Etsy.com is an example of a marketplace where one-off (or nearly one-off) goods have taken hold. People seek out products and goods in online and other marketplaces that support artists and creators with a view to having a good or product that is special to themselves. As a result, the products there are non-uniform and may run out of supply. One can only knit so quickly to satisfy demand.

People have attempted to tackle the desire for unique products in a number of ways. The patentee has obtained several patents somewhat related to this concept, including U.S. Pat. Nos. 8,655,744 and 8,577,750 which relate to a process for ordering and reordering unique blends of hair colorant. The patentee has also obtained U.S. Pat. No. 10,532,335 for a system for creating hair colorant. Each of these inventions in some part deals with creation of one-off cosmetic products unique to each customer. However, as the number and types of components or ingredients increases, continuing to enable this type of one-off manufacturing capability likewise increases. Problems arise that must be solved in order to create other, more complex, products.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
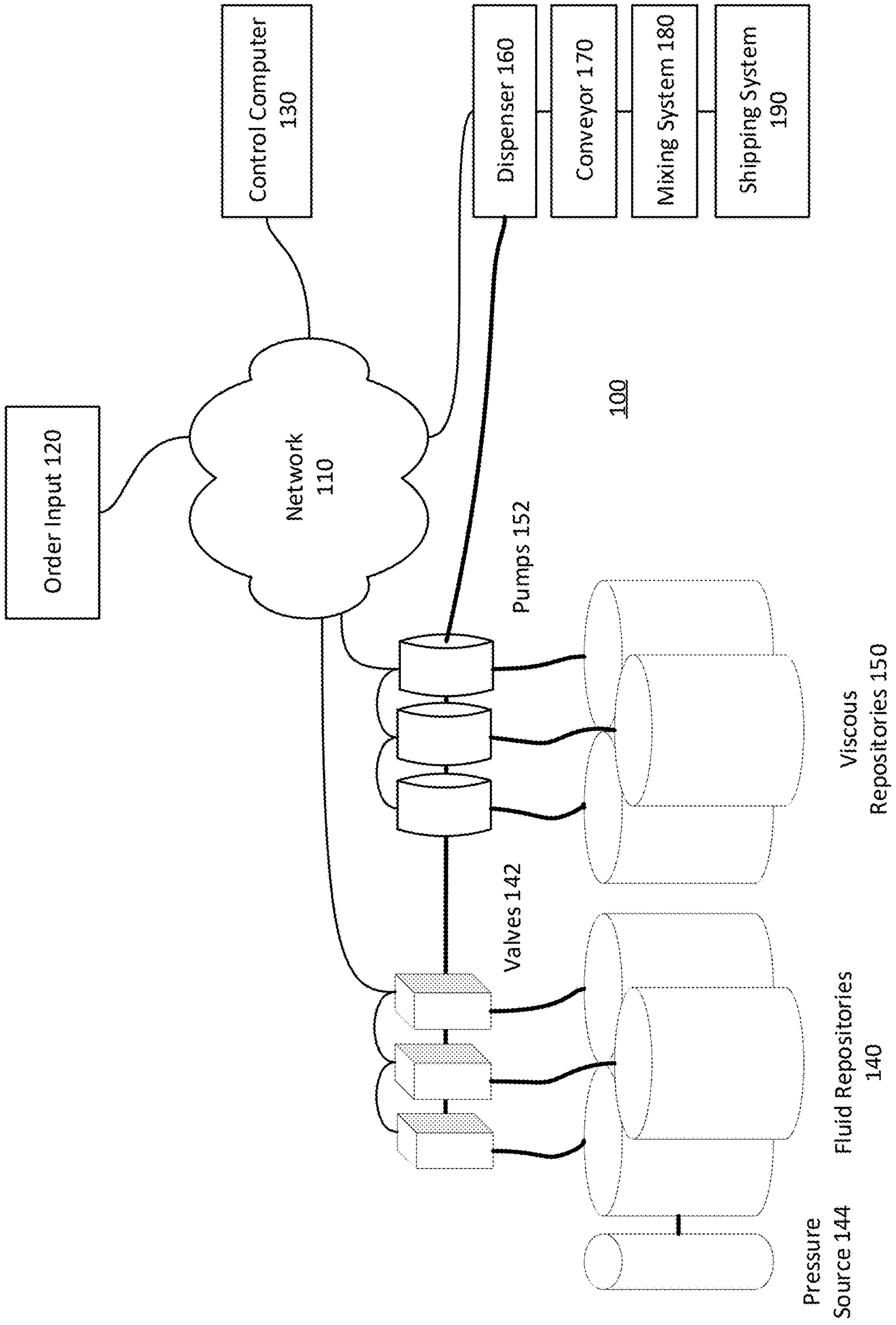
FIG. 1 is an overview of a computer-controlled single manufacturing system for generating individualized mixtures.

Referring now to FIG. 1, an overview of a computer-controlled single manufacturing system 100 for generating individualized mixtures is shown. The system 100 includes order input 120, a control computer 130, fluid repositories 140, valves 142, a pressure source 144, viscous repositories 150, pumps 152, a dispenser 160, a conveyor 170, a mixing system 180, and a shipping system 190 all interconnected by a network 110.

The network 110 is a data communications channel connecting the various components of the system 100. The network may be or include the Internet, but more likely is at least in part a wired ethernet connection or a wireless 802.11x connection. In addition, connections to baseline components such as valves 142 and pumps 152 may merely be electrical switches with either "on" or "off" or gradients of power levels (e.g. 40% to the pumps 152). Those communications may be transmitted as a part of the network 110 in the form of a breadboard or customized controller board that operates under the instruction of the control computer 130 to indicate "on" or "off" settings or a desired output level.

The other components such as the order input 120, dispenser 160, conveyor 170, mixing system 180, and shipping system 190 may communicate directly through communication systems like USB cables or other wired connections or may be wirelessly connected through an 802.11x connection or Bluetooth® connection. Some of those components may be connected electrically for "on" and "off" directions (e.g. conveyor 170 or mixing system 180) controlled by the control computer 130. The network 110 may include other types of network connections such as Zigbee® protocols, custom communication protocols, infrared communications systems, or other systems suitable for short-range communication between the various components of the system 100.

The order input 120 is a hardware or software component that accepts input of orders and/or instructions from an instruction source to begin the process of one-off manufacturing. The instruction source may be an order created by a web server on the Internet. The order input 120 may be a part of the control computer 130, connected to the Internet to receive orders from the Internet or from another controlling server located locally to the system 100 or the control computer 130. It may be, in whole or in part, hardware or software. The order input 120 may be a standalone server in its own right with which order placers (e.g. customers) or manufacturing operators (e.g. a company using the system 100 to fill orders for others) use for providing instructions in manufacturing. There may be a translation generated by the order input 120 from user input (e.g. a product having these characteristics) into instructions for manufacturer (e.g. the mixture must have X amount of A chemical and Y amount of B chemical) before the instructions are provided to the control computer 130.

Figure 5:
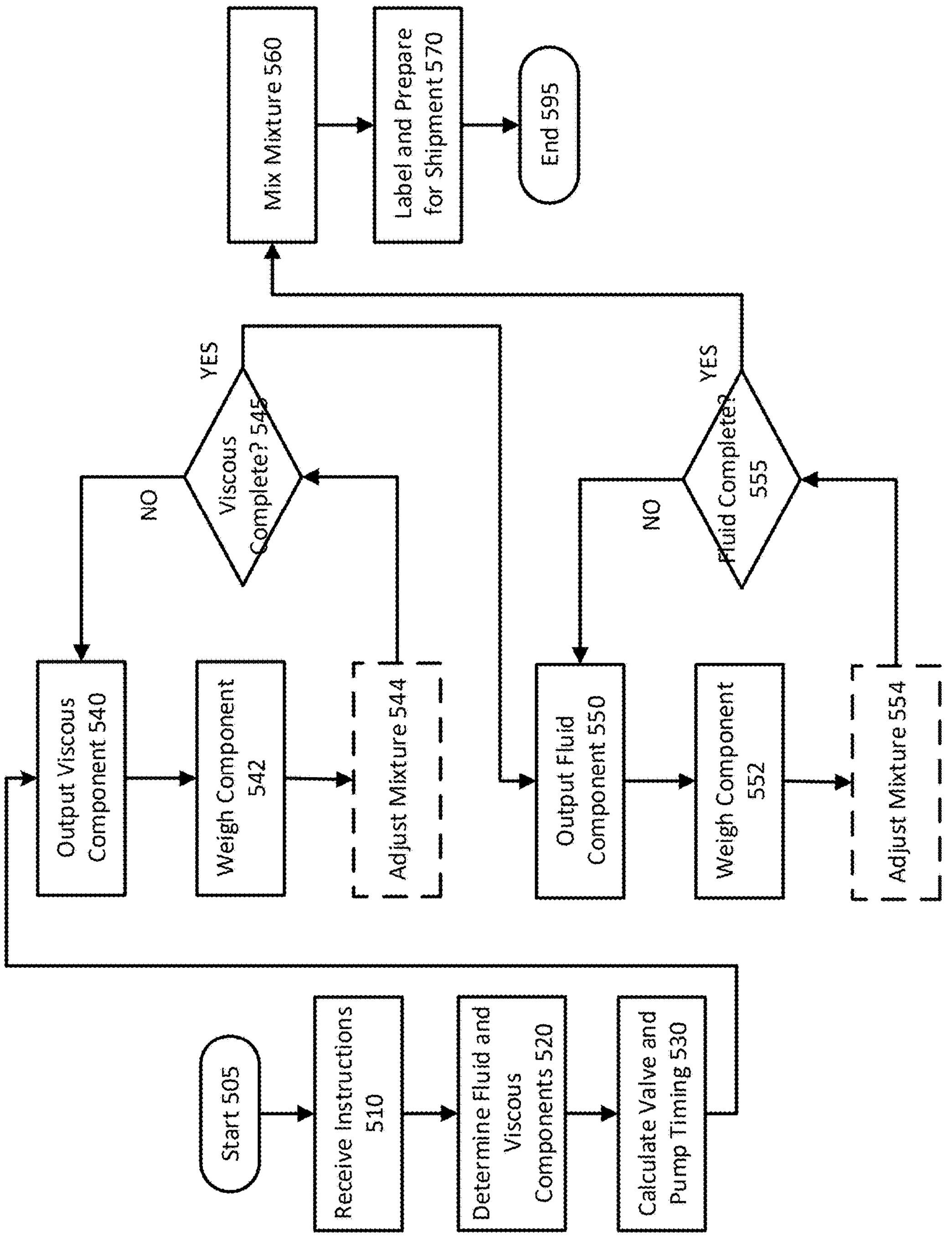
FIG. 5 is a flowchart for a process for computer-controlled generation of individualized mixtures using a system for computer-controlled single manufacturing.
Figure 6:
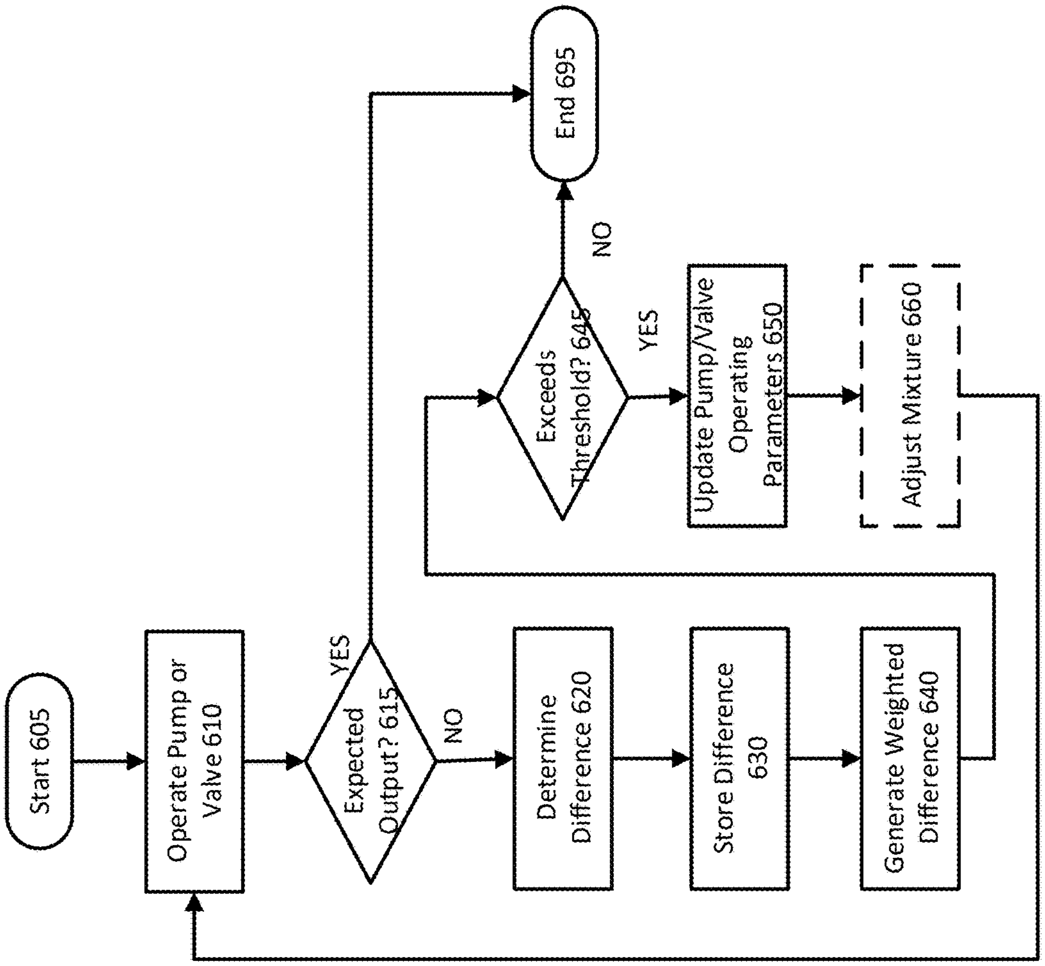
FIG. 6 is a flowchart of a process for continuously and dynamically recalibrating pump and valve operation in a computer-controlled single manufacturing system for generating individualized mixtures.
Figure 7:
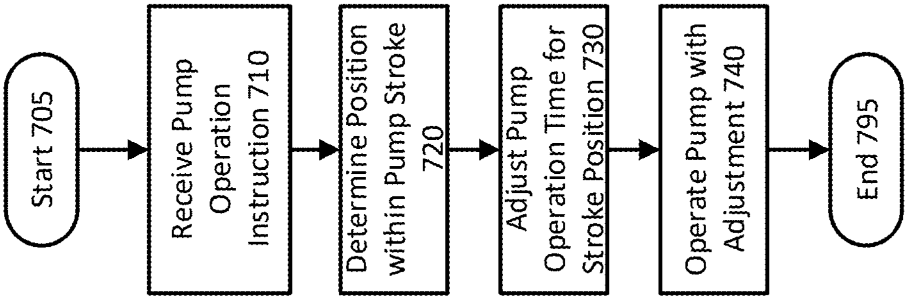
FIG. 7 is a flowchart of a process for predictive overshoot compensation in operation of pumps in a computer-controlled single manufacturing system for generating individualized mixtures.

The control computer 130 is a computing device (see FIG. 2) that operates to control the system 100 and orchestrate the functions described herein (see FIGS. 5-7). It incorporates hardware and software, the hardware to enable it to communicate using the network 110 with the various components of the system 100 and the software to instruct the components of the system 100 how to operate to generate mixtures according to the instructions provided by the order input 120. The control computer 130 includes a number of components discussed with reference to FIG. 3 below.

As used herein, the word "fluid" means liquids that have a viscosity at or near the viscosity of water at room temperature. Water has a viscosity of 1 centipoise (cps). Milk has an approximate viscosity of 3 cps. In contrast, typical motor oil has viscosities between 85 and 1,000 cps, corn syrup has an approximate viscosity of 5,000 cps, while honey has an approximate viscosity of 10,000 cps. So, as used herein, a "fluid" is a liquid having a centipoise of less than approximately 50 cps. As used herein, the word "viscous" means a liquid having a centipoise of more than 50 cps and less than 200,000 cps (slightly thicker than the approximate centipoise of room temperature sour cream).

The fluid repositories 140 are repositories of fluid components to be used in mixtures as fluid is defined herein. One of the key attributes of fluid components used in the present system 100 is that they are water-like or near-water like in their viscosity. As a result, they may be transmitted through tubing as controlled by valves 142 by the mere application of pressurization to the associated tubing. That pressurization is provided by a pressure source 144.

The pressure source 144 may be an electrically powered air pump that operates to maintain pressurization within a pressurized air chamber with a known pressure per square inch (PSI). That chamber may be connected to one or more of the tubing lines joining the fluid repositories 140 to the valves 142 and ultimately to the dispenser 160. As a result, when the valves 142 are operated to an open position as directed by the control computer 130, the associated fluid components are transmitted at a predictable rate through the tubing to the dispenser 160 because the associated pressurization is relatively uniform as maintained by the air pump. Other pressure source 144 possibilities include air (or other gas) tanks that are periodically filled to pressurize them or air pumps that have no associated air tank and operate electrically to pressurize the tubes as directed by the control computer 130. The valves 142 may be opened and closed with known timings, generated over time based upon experience of flow rates of the particular fluid component, to dispense a known amount out of the dispenser 160. Examples of fluid envisioned by the present claims include alkaline agents used in creating hair dyes, water, dyes, detergent dilutes and concentrates for cleaning, and similar fluids. The valves 142 are controlled by the control computer 130.

The viscous repositories 150 store viscous components for use in creating mixtures as viscous is defined herein. The viscous components are such that they are not suitable for pressurization of the associated tubing. Pressurization tends to "clump" viscous repositories or cause "bursts" of viscous components to pop out of the dispenser 160. Moving viscous components through narrow tubes require repositories subjected to large pressures (30-200 psi). High pressure large repositories are complex to make and can be dangerous to operate. As a result, for the viscous repositories 150, pumps 152 are used.

The pumps 152 generally operate under known parameters (e.g., a particular pump-rate or flow-rate). However, every kind of reciprocating pump has high and low points in its pumping stroke. A stroke, as used herein, is the full cycle or a sub-cycle of a pump that demonstrates variances in throughput from beginning to end. For example, a very simple pump is a piston pump. A simple piston pump operates by pulling a piston backwards within a tight, enclosed space. While pulling backwards, with a liquid source valve open, the desired liquid is sucked into the pump. Thereafter, the input valve is closed, the exit valve is opened, and the piston is forced forward in the tight, enclosed space. As that piston moves forward, it forces the liquid out through the exit valve. These types of pumps are used in engines to pull in air and fuel mixtures, then expelled in much the same way, but they may be used for liquids as well. There are variations of these types of pumps such that strokes are reversed in operation, axles cause the piston to move, or a series of pistons continuously pump with more even output.

For a piston pump, the "stroke" is from the piston being at its furthest position to a base to the closest position and back to the furthest position. So, for the piston pump stroke, the material being pumped is moved forward virtually none at all during the fill stage while it is being pulled into the chamber. But, as the bottom of the stroke is reached and the chamber is completely filled, the piston begins moving upward and material starts moving through the system. Initially, at the beginning of the upstroke, the material moves only a little. But, once the piston's full speed is reached, the fluid moves relatively uniformly throughout the stroke until the piston reaches the far end of the chamber, where the piston slows down. Thus, the stroke of a piston pump may begin with zero movement of fluid, stay there for some time while the chamber is filled, ramp up to its full throughput, stay at full throughput as the piston moves towards the far end of the chamber, ramp down to zero movement of material, and then stay there for some time while the chamber is filled. The piston pump will continue in this way throughout its operation.

In contrast lobe pumps or gear pups have a series of lobes or gears that extend outward and interact with the substance to be pumped. They are designed to operate much more continuously than piston pumps, but between lobes or points of gears there is a distinct loss of power. However, because these pumps are rotary and can continuously operate, these pumps stroke from a valley of a gear or lobe to a peak of the gear or lobe and back to the valley again. They have an output that may begin with obtaining the fluid, ramping up slowly to a maximum point, then inflecting down immediately to a lower power, hitting a valley which has the least throughput, and then immediately ramp up to more power. This stroke is much more variable, but consistent as the pump has no long downtime while the pump is being filled. These types of pumps generally have strongest throughput earliest in their strokes, with that throughput dissipating over the course of the stroke.

The pumps 152 may be used to pump viscous components out of the viscous repositories. Rotary pumps, piston pumps, and other types of pumps can be used. However, unlike pressurization of the fluid pipes, the use of pumps and variability of pump throughput introduces problems in terms of predicting throughput for dispensing precise amounts of constituent elements of mixtures. Ways in which to deal with those issues are discussed more fully below. The pumps 152 are controlled by the control computer 130.

As described herein, and as claimed in claim 1, specific, unique mixtures can be obtained by channeling fluid components and viscous components along different paths using different dispensing techniques designed to take into account the different flow of each component. The differentiated dispensing mechanisms rely upon pressurization of fluid component repositories and flow tubing along with valves to control the dispensing itself. Viscous components rely upon precisely-controlled pumps and in some cases valves as well. The differentiated paths and systems enable much more precise control on the amounts of each component dispensed, and thus enable real-time creation of unique mixtures according to desired instructions detailing components and their relative amounts to create a desired mixture.

The dispenser 160 is a location where the components from the fluid repositories 140 and the viscous repositories 150 are dispensed. The dispenser 160 may be a single nozzle into which all of the tubing joining the fluid repositories 140 and viscous repositories 150 flow or it may be a series of closely arranged nozzles, one for each of the repositories 140 and 150. The dispenser 160 may simply be a nozzle or series of nozzles, but more likely, the dispenser 160 may include various valves and may be movable so as to properly dispense constituents into receptacles (e.g. bottles or vials).

In at least one embodiment, the dispenser 160 is controlled by the control computer 130 and includes at least two valves for each fluid or viscous component. The valves close to the dispenser nozzle(s) help to ensure uniform flow of the component into a receptacle. In addition, the entire dispenser 160 may be mounted on a movable platform and may employ laser or image scanners to identify or obtain order information directly from a receptacle. As discussed in U.S. Pat. No. 10,532,335, owned by the assignee of this patent, directions for creating mixtures may be printed explicitly on the exterior of bottles into which the present system 100 deposits the desired mixture. A scanner or computer imaging that is a part of the order input 120 may be used to obtain the directions and may be a part of the dispenser 160. The dispenser's movable platform may also ensure that the nozzle for a given fluid or viscous component is properly aligned with the opening in a receptacle for dispensing.

The conveyor 170 is one or more automation systems designed to ensure that a viable receptacle is obtained, placed in the dispenser 160, and then is transferred to the mixing system 180 and shipping system 190. The conveyor 170 is shown as a single conveyor 170, but may be many conveyors operating in unison. The conveyor 170 is a conveyor, but may also be or include other automation systems such as arms, claws, grips, clamps, belts, levers, ramps, and the like. The word conveyor 170 is used because it is familiar. It is a series of elements that move the receptacle into position to be filled and, once filled, through to shipping. The conveyor 170 is controlled by the control computer 130.

The mixing system 180 is a system for ensuring that the mixture created by the system 100 is adequately mixed. The mixing system 180 may interact with a receptacle of a given mixture to shake it, stir it, or otherwise ensure that it is adequately mixed. One issue introduced by the use of both fluid components and viscous components is that they do not naturally mix very well. In particular, those components tend to stay separate from one another. So, the mixing system 180 can ensure uniformity of the resulting mixture after all of its constituents are added to a receptacle. The mixing system 180 may be or include a centrifuge or centrifuge like mixing area where one or more receptacles are rapidly spun around a central point, thereby forcing the viscous components in particular to merge with the fluid ones. Shaking based mixing systems, as well as tumbling based mixing systems are also possible. The mixing system 180 can be controlled by the control computer 130.

The shipping system 190 is a system for preparing and/or shipping the resulting mixtures to their recipients. The shipping system 190 may be, in whole or in part, a shipment labeling system that prints out labels and applies them to the receptacle for the mixtures, or associated shipping boxes. The shipping system 190 may place the filled receptacles into the shipping boxes (e.g. using claws or other systems) and apply the labels automatically. The shipping system 190 may be in whole or in part reliant upon humans to place the receptacles in shipping boxes, to apply shipping labels, or to otherwise prepare them for shipping. The shipping system 190 is controlled by the control computer 130.

Figure 2:
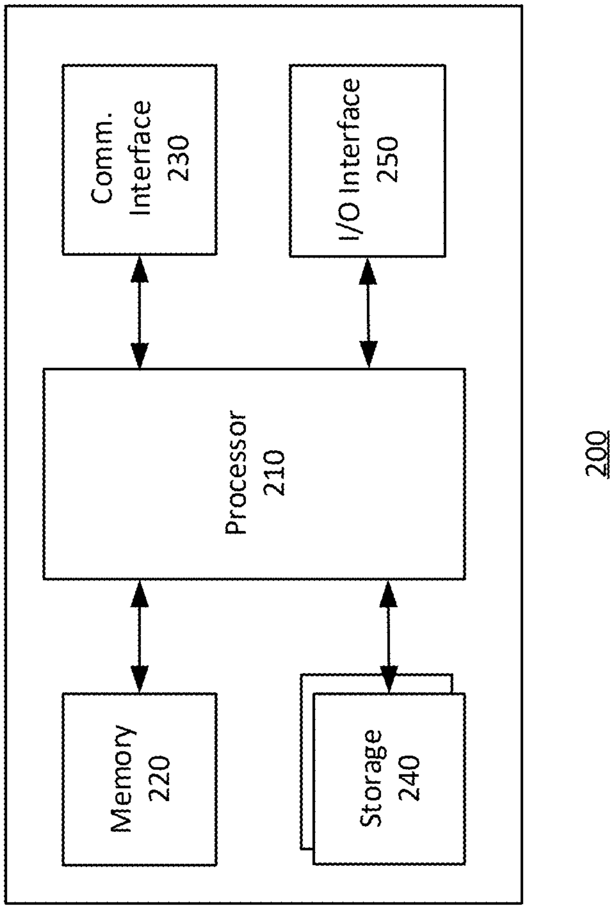
FIG. 2 is a block diagram of an exemplary computing device.

FIG. 2 is a block diagram of an exemplary computing device 200, which may be a part of the self-contained colorant system 120 or the server 130 of FIG. 1. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device 200. That is, the software may be stored in electronic, machine readable media. These storage media include, for example, magnetic media such as hard disks, optical media such as compact disks (CD-ROM and CD-RW) and digital versatile disks (DVD and DVD±RW), flash memory cards, and other storage media. As used herein, a storage device is a device that allows for reading and/or writing to a storage medium. Storage devices include hard disk drives, DVD drives, flash memory devices, and others.

Figure 3:
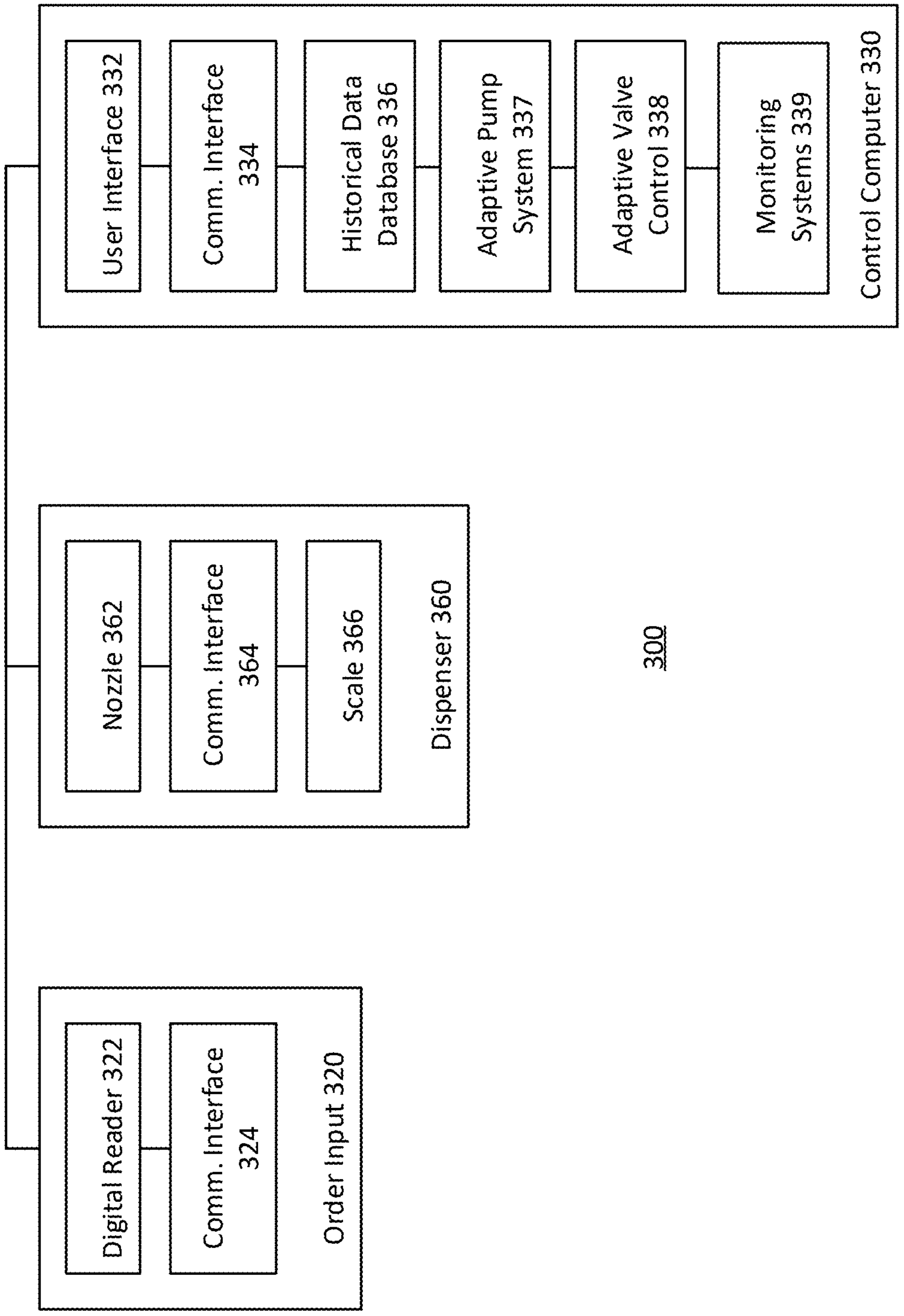
FIG. 3 is a functional block diagram of several components of a computer-controlled single manufacturing system for generating individualized mixtures.

FIG. 3 is a functional block diagram of several components of a computer-controlled single manufacturing system 300 for generating individualized mixtures. The system 300 includes the order input 320, the control computer 330, and the dispenser 360. The components are shown separately as divided by their respective functions, but some or all may be integrated into one another.

The order input 320 is the order input 120 from FIG. 1 and includes a digital reader 322 and a communications interface 324. As discussed above, the order input 320 may be or include the Internet and/or a website for accepting orders. That order input may be processed by the communications interface 324. In such a mode of operation, an order, including the instructions for making a particular mixture, may be transmitted over the Internet or another network (e.g. from the control computer 330) to the order input 320.

However, preferably, the order input 320 includes a digital reader 322 that may be a barcode, QR code, RFID, NFC, or other reader or may include a digital still or motion camera or infrared camera for reading information from a receptacle such as a bottle, can, or other object into which a mixture will be placed. In one mode of operation, a barcode reader may read a label that was previously printed for the receptacle, the label containing the instructions for creating a desired mixture. To be clear, these are the instructions (e.g. the amounts and type of each component of a given mixture) as opposed to a reference to a database wherein the instructions are stored. The label stores the instructions, not any reference to any other place where instructions are stored. This is in part because the present system 300 is capable of generating virtually any unique mixture as desired or directed by such instructions because it is intended for that purpose of uniqueness, unlike mass-production of the same mixture over-and-over again.

The communications interface 324 is used to communicate with the other components of the system 300, including the control computer 330 to accept instructions on how to operate and the dispenser 360. The communications interface 324 may be or include the Internet or other wired or wireless networks.

The control computer 330 is the control computer 130 from FIG. 1 and includes a user interface 332, a communications interface 334, a historical data database 336, an adaptive pump system 337, an adaptive valve control 338, and monitoring systems 339. The control computer 330 controls the entire operation of the system 300, including receipt of instructions from the order input over the communications interface 334 and operation of the valves 142 and pumps 152 to create a mixture and eventual dispensing using the dispenser 360.

The control computer 330 uses the user interface 332 to accept commands. This user interface may be a touchscreen, and the control computer 330 may be a tablet computer or may be a microcomputer, such as a personal computer, an all-in-one computer such as a Raspberry® Pi® computer, or may take many other forms. The user interface 332 may be web-based such that the user interface 332 is transmitted over the communications interface 334 to another computing device for display thereon and interaction with the control computer 330 from that other computing device. The user interface 332 accepts commands, such as resetting the device, selecting creation or recreation of a particular mixture, priming pumps or opening and closing valves to correct errors, or otherwise interacting with the entire system 300.

The communications interface 334 is used by the control computer 330 to communication with the rest of the system 300. The communications interface 334 may be or include the Internet or other local network connectivity. The communications interface 334 may in some cases merely be a conduit through which control of elements like valves and pumps takes place, though the communication may, in such cases, merely be to turn the pumps and valves on or off.

The historical data database 336 is used to store data regarding the status of the various repositories of components of the mixtures, for example, storing their capacities, the amount that has been used since each was last filled, the speed at which each component exits through the dispenser 360, any irregularities in the speed of exit from the dispenser 360, weight data (as weighed by scale 366) for historical pump actuations or valve openings and closings, any differences in the viscosity of constituents across batches or due to ambient temperatures or pressures, and any inconsistencies having to do with pump operation or differences in pressurization of the tubing connecting repositories to the dispenser 360. The data in the historical data database 336 is continuously updated as new mixtures are created based upon output by the scale 366 and the monitoring systems 339.

The adaptive pump system 337 may rely upon data from the historical data database 336 to dynamically alter the operation of the pumps or to account for inconsistent operation of the pumps in an effort to consistently create identical or near-identical output of the various viscous components from the viscous repositories 150 through the dispenser 360. The adaptive pump system 337 may take into account discrepancies in the constituents, the temperature, the pressure, the distance from a pump to a valve or dispenser, and/or the throughput or efficiency of operation of the pumps so as to operate the pumps intelligently to ensure accurate dispensation of each constituent of a given mixture from the dispenser 360. Other factors may also be considered the adaptive pump system 337 attempts to aid the control computer 330 in accurately controlling the pumps 152.

The adaptive valve control 338 performs a similar function for the valves, reliant upon data from the historical data database 336, to control the opening and closing of the valves in response to changes in density, viscosity, temperature, and/or pressurization of the fluid repositories 140. The adaptive valve control 338 attempts to inform the control computer 330 in accurately controlling the valves 142.

The monitoring systems 339 track one or more of the amount of time each valve 142 is open, the pressurization of the associated tubing, the time during which each pump 152 runs, the various data stored in the historical data database 336, and any newly added information provided by the scale 366 to continuously update the historical data database 336. The data may also be weighted so that more recent data may be weighed more heavily. Different batches of the constituent components from the fluid repositories 140 and viscous repositories 150 can have different densities, viscosities, and other characteristics that change when the repositories are re-filled after use. As such, the most relevant data is the most-recent data by a far margin when determining how long to operate a pump to achieve a certain amount of output or how long to leave a valve open at a given pressurization level. The monitoring systems 339 may update the data stored and inform the control computer 330 of the status of the overall system.

The dispenser 360 is the dispenser 160 from FIG. 1 and includes a nozzle 362, a communications interface 364, and a scale 366. The dispenser 360 dispenses the constituent components of a given mixture as directed by the control computer 330.

The nozzle 362 is the place from which the fluid components and viscous components exit and are dispensed into a receptacle or container. The nozzle 362 may be one nozzle or may be multiple nozzles and may include flow control valves, a platform for dispensing, and a series of valves. The inventors have discovered that a movable platform on which the nozzles are placed in an experimental embodiment for purposes of aligning the nozzle 362 with a receptacle resulted in inadvertent output as the platform was moved by motor actuators (also controlled by the control computer). To counteract this movement, the platform itself is preferably equipped with one or more flow control valves per nozzle to ensure that output of components only occurs when a valve is open or a pump is activated by the control computer 330. Otherwise, incorrect elements may enter the containers for a particular mixture. The flow control valves may be distinct and in addition to from the valves used to control flow of pressurized fluid components. The flow control valves may only be present on or in near proximity to the nozzle 362.

A communications interface 364 enables the control computer 330 to instruct the nozzle 362, associated motor actuators, valves, the platform, and any other elements of the dispenser 360 so as to enable creation of desired mixtures. The digital reader 322 may also be a part of the dispenser 360 in some cases. The communications interface 364 may be or include the Internet or other network connectivity with the control computer 330.

The scale 366 is preferably a digital scale in communication with the control computer 330 to accurately measure and record the output from the various repositories as directed by the control computer 330. The control computer 330 and monitoring systems 339 can then track the output and pump actuation and update the historical data database 336 for use in later dispensing of components. In addition, the scale 366 ensures that accurate amounts of each desired constituent part are added to a given mixture as directed by the instructions and provides opportunity for correction, for example, by adding more of the other constituents so that the associated ratios of each constituent are correct.

Figure 4:
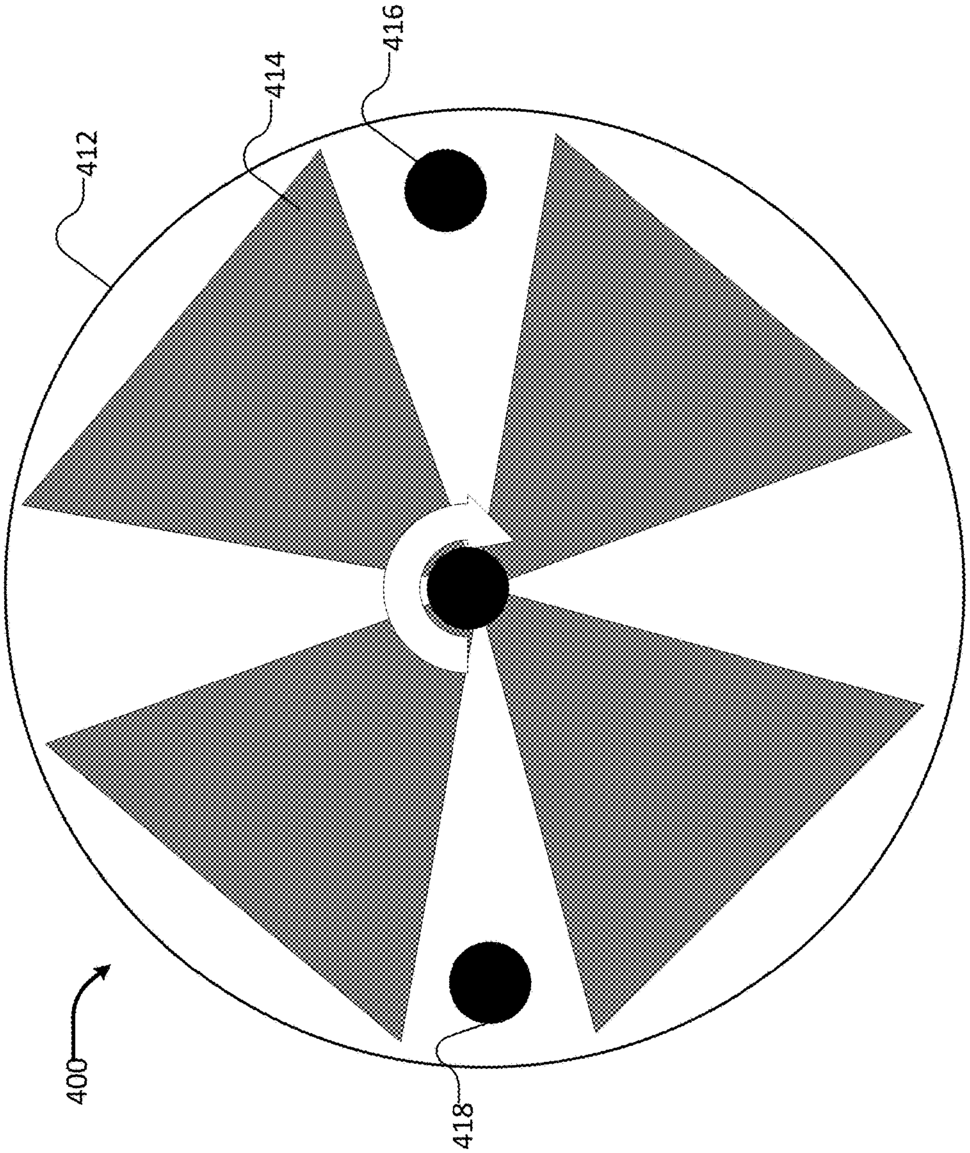
FIG. 4 is a side view of an example chambered reciprocating pump.

FIG. 4 is a side view of an example chambered reciprocating pump 400. The pump 400 has several chambers 414 within its casing 412 and is designed to operate in a rotary fashion. The pump 400 has an inlet 416 and an outlet 418. One or both may be covered by valves that operate to ensure fluid does not move backward in the pump.

As the pump turns, each chamber 414 moves over the inlet 416, fills with viscous component, then moves in a rotary fashion along to an outlet through which viscous component is pushed outward until the chamber 414 is largely empty. The use of four chambers here in this pump is exemplary, other numbers of chambers may be used.

As can be seen, when the pump is "between" chambers, there is no output or low output. When the outlet 418 is mid-chamber, the output is highest. As a result, the pump 400 operates in an uneven manner. In addition, different pumps operate at different efficiencies and with different levels of output altogether. The control computer 330 (FIG. 3) may compensate for these irregularities.

Description of Processes

Referring now to FIG. 5 a flowchart for a process for computer-controlled generation of individualized mixtures using a system for computer-controlled single manufacturing. The flow chart has both a start 505 and an end 595, but the process may be cyclical in nature, taking place over and over with each new mixture for which instructions are received.

Following the start 505, instructions for creation of a mixture are received at 510. These instructions may come in the form of a computer-readable label that is printed on or otherwise affixed to or a part of the receptacle or container into which the mixture will be dispensed. Alternatively, the instructions may come from an internet server or from a database accessible to the system 100 (FIG. 1). The instructions are preferably complete in themselves. That is, they are not a referral to a website or other database from where the operating parameters of the system 100 and amounts of each component of a given mixture may be obtained. Instead, they are the operating parameters and/or amounts of each component necessary to create the mixture. If necessary, the instructions are also ordered, so that components may be added in the most-beneficial order for the desired mixture result.

Next, using the instructions, the types and amounts of each fluid and viscous component are determined at 520. Because the instructions describe the process and components and amounts of components to make a desired mixture, the control computer 330 (FIG. 3) can calculate the valve and pump timing 530 using the data from historical data database 336 (FIG. 3).

For example, to create a conditioner, a viscous base may be one component that makes up _% of an eventual mixture, while two or three viscous conditioning components may make up _%, while water may make up _% and a liquid fragrance may make up _% of the eventual mixture. Using this information and the total size of the container, the control computer 330 can calculate the timings for how long each valve should be open for the fluid components and how long a pump should run for each viscous component. This may be based upon the historical data database 336 including any irregularities tracked about the particular components and their output.

First, the viscous components are output at 540. This involves the control computer 330 instructing the associated pump(s) 152 to operate, each in turn. So, in the example above, the viscous base pump, and the two or three viscous conditioning components associated pumps would each be operated in turn. The timings for each pump (how long to operate them to reach a desired output) are controlled by the control computer 330.

Once a viscous component is output through the nozzles of the dispenser 360, then the component is weighed at 542 using the scale 366. This step is to ensure that the viscous component is output in a desired amount, within tolerances that may be, for example, within 5% of a desired output. In addition, the weight information may be used to update the historical data database 336. If the amount output is too much or too little, an optional step enables adjustment (e.g. by adding more or by adjusting at 544 the overall mixture to account for more than expected of one component).

If there are other viscous components to be added ("No" at 545), then the process returns to output the next viscous component at 540. If the viscous components have all been added ("yes" at 545) and that process is complete, then the process turns to the fluid components. The order of dispensing is not necessarily fixed. The fluid components may be added in some cases prior to the viscous components. Or, the two component types may take turns being dispensed.

The first fluid component is added at 550. It is added after the viscous components to aid in mixing later. The valves are opened at the direction of the control computer 330 for a pre-determined time based upon the instructions.

Once the fluid component is added, the overall mixture is weighed to confirm that the correct amount has been output at 552. This information can also be used to update the historical data database 336. If there is some unexpected output (e.g. too much or too little of a given fluid component), then mixture may be adjusted at 554. As with the pumps, this may involve adding more of a given fluid or adding more of the overall other components to compensate for the incorrect amount. The important point is to have the relative percentages the same. As with the pumps, there may be a threshold level of inaccuracy that is acceptable (e.g. 5% or 10%).

If there remain other fluids to be added ("No" at 555), then the next fluid component is output at 550 and the process continues. If the addition of fluids is complete ("Yes" at 555), then the process continues.

Following addition of all fluid and viscous components, the overall mixture is mixed at 560. As indicated above, this mixture process may rely upon a shaking mixer, a tumbling mixer, a centrifuge or other spinning mixer. Other mixing systems 180 are possible as well. The mixing may be partially or fully automated such that conveyers move the finished mixture from the dispenser to a mixing station where mixing takes place. Humans may be involved as necessary or helpful.

Finally, after the mixture is transported through the mixing system 180, it is labeled and prepared for shipment at 570. This process places the mixture in a box or other shipping container for shipping. A shipping label may be applied so that it is ready to be sent to its purchaser. As the focus of this system is on one-off, unique products specific for one customer, each label is unique as each product is unique. Large batches are generally not done in this system, but single batches for one user that are shipped individually to the requesting person.

The process then ends at 595.

FIG. 6 is a flowchart of a process for continuously and dynamically recalibrating pump and valve operation in a computer-controlled single manufacturing system for generating individualized mixtures. The flow chart has both a start 605 and an end 695, but the process may be cyclical in nature, taking place over and over with each new mixture for which instructions are received.

Following the start 605, the process begins with operation of a pump or valve at 610. The operation is monitored by the monitoring systems 339. This includes access to the scale 366, so that accurate measurements of the output of a given component for the mixture may be ascertained. The resulting output for a given pump operation time or valve open time is logged.

Next, it is determined whether or not the resulting output is expected, within certain parameters (e.g. a threshold level of difference may be acceptable) at 615. If all is as expected ("Yes" at 615), then the process ends at 695.

If all is not as expected ("No" at 615), then the process proceeds to determine the difference at 620. At this step, the difference between expected and actual output is noted. This may be an over-pump or over-pour or it may be an under-pump or under-pour. That difference is stored at 630 in the historical data database 336.

Next, a weighted difference is generated at 640. If the difference is minimal or if it is an unusual occurrence, no resulting change need be made. However, if there appears to be a pattern or a growing pattern, the system may note that as well. In order to do that, it may not weight a single occurrence of an over-pour or under-pump sufficiently to update the control computer's algorithms related to pump or valve timings for a given component. Instead, it may be required that it occur several times. In some cases, a single instance may be sufficient weight to alter the pump or valve timings at least partially.

A determination by the control computer 330 is made at 645 whether the threshold level of difference has been exceeded by the weighted difference calculated at 640. The threshold level of difference may be small in some cases (e.g. 0.5%) or may be large in other mixtures or with other components such as a conditioner base (e.g. 5% or 10%).

Alternatively, another adaptive dispensing method may rely upon historical data to generate dispensing model for the pumps. That model may generate an output curve (e.g. because pumps vary in their output over a given stroke) so as to enable the system to predict output from the pump given its present status and the historical curve. This enables the system to model output for each particular "run" of the pump from its starting point in a given stroke to its end point in that same stroke, based upon the volume of viscous component required. This dispensing model may rely upon a curve fit method to predict how long it should dispense this particular formula. The model may instruct the system to pause to re-evaluate itself with a margin of safety to avoid over dispensing by a large amount. This model, or any model, may be tuned to prefer under dispensing, because under dispensing is easy to recover from by simply dispensing more of a desired component.

Other adaptive methods may be used, reliant upon historical data regarding the pumps and the characteristics of the viscous components.

If the threshold is not exceeded ("No" at 645), then the process ends at 695. If it is exceeded ("Yes" at 645), then the pump/valve operating parameters are updated at 650. This involves updating the historical data database 336, using the adaptive pump system 337 or adaptive valve control 338 to alter the length of time the associated pump is activated for a given amount of viscous component or the associated valve is open for a given fluid component.

As this process is taking place constantly while mixtures are being made, the mixture itself—which may be for a customer—may be adjusted as well at 660. This may involve starting over completely, or merely adding more of one or more components to make the mixture's overall ratios within desired tolerances.

Because the process is continual while mixtures are being created, the process never really ends. Its only breaks are when the overall system operates as expected for desired outputs from both the fluid and viscous component repositories.

FIG. 7 is a flowchart of a process for predictive overshoot compensation in operation of pumps in a computer-controlled single manufacturing system for generating individualized mixtures. The flow chart has both a start 705 and an end 795, but the process may be cyclical in nature, taking place over and over as an associated pump operates.

Following the start 705, the process begins with a given pump receiving an operation instruction at 710. This may be, for example, operate for 0.7 seconds (which may be associated with a throughput of approximately 3 ounces of a viscous component of a mixture through a dispenser and into a container). However, as discussed above, pump operation is not uniform throughout the stroke.

So, before the pump actuates, the control computer 330 determines the position of the pump within the pump stroke 720. In actuality, this position may simply be noted by tracking the throughput over time in the historical data database 336. So, the control computer 330 may be able to estimate the stroke position for all pumps at any moment, because it has recently used the pumps and noted their throughput.

Based upon the stroke position (or as may be known by the control computer 330, the throughput curve for a given pump), the pump's operation time estimate of 0.7 seconds may be adjusted at 730. For example, if the pump's stroke just finished and it will not pump anything for 0.2 seconds, then the operation time may be extended to 0.9 seconds. If the pump is mid-stroke and its entire stroke is 3 seconds, then no adjustment may be necessary because the full 0.7 seconds falls within that stroke's middle point. If the stroke is near its start and will have more throughput early, the overall timing may be adjusted down to 0.6 seconds to account for a strong start to the throughput. All of this may be with the goal of reaching approximately 3 ounces of eventual output. Each time a pump operation is requested by the control computer 330, this process may take place before instructing the pump how long the pump should operate.

Once the adjustment is calculated, the pump is operated with the adjustment at 740. Thereafter, this process ends at 795.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms “comprising”, “including”, “carrying”, “having”, “containing”, “involving”, and the like are to be understood to be open-ended, i.e., to mean including but not limited to. Only the transitional phrases “consisting of” and “consisting essentially of”, respectively, are closed or semi-closed transitional phrases with respect to claims. Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, “and/or” means that the listed items are alternatives, but the alternatives also include any combination of the listed items.

It is claimed:

1. A computer-controlled dispenser system comprising:

a first set of repositories for fluid components suitable for combination into different mixtures;

a second set of repositories for viscous components suitable for combination into different mixtures;

a dispensing nozzle where the fluid and viscous components are dispensed;

at least one set of tubing connecting both the first set of repositories and the second set of repositories to the dispensing nozzle;

at least one associated valve interposed between the first set of repositories and the dispensing nozzle, the at least one set of tubing for each of the first set of repositories being joined to a pressurization source to force the fluid components through the at least one set of tubing to the dispensing nozzle as controlled by opening and closing the at least one associated valve;

at least one pump coupled to the at least one set of tubing for each of the second set of repositories to pump the viscous components through the associated at least one set of tubing to the dispensing nozzle;

a scale for measuring an amount of fluid and viscous components dispensed from the dispensing nozzle;

wherein a control computer receives instructions for a first mixture, causes a pump of the at least one pump to pump a viscous component from one of the second set of repositories to be dispensed from the dispensing nozzle according to the instructions and opens a valve of the at least one associated valve to enable a fluid component from one of the first set of repositories to be dispensed from the dispensing nozzle according to the instructions to be combined with the viscous component to create the first mixture.

2. The computer-controlled dispenser system of claim 1 wherein the control computer further receives second instructions for a second mixture, distinct from that of the first mixture, to be created and thereafter operates to open a second valve of the at least one associated valve of a set of tubing associated with one of the first set of repositories to enable a fluid component to be dispensed from the dispensing nozzle according to the second instructions and the control computer operates to cause a second pump of the at least one pump to pump a viscous component from one of the second set of repositories to be dispensed from the dispensing nozzle according to the second instructions to be combined with the fluid component and thereby create the second mixture.

3. The computer-controlled dispenser system of claim 2 wherein the control computer receives instructions to create a plurality of unique mixtures in serial, each with distinct instructions comprising components and relative amounts in the first set of repositories and the second set of repositories, and sequentially creates a unique mixture for each of the plurality of unique mixtures.

4. The computer-controlled dispenser system of claim 1 wherein the fluid component and the viscous component are measured using the scale to ensure that a desired amount of each is dispensed into a container.

5. The computer-controlled dispenser system of claim 4 wherein, when one of the fluid component and the viscous component is over-dispensed, the control computer operates to cause an additional amount of another of the fluid component and the viscous component to dispense to cause the first mixture to be appropriately proportioned.

6. The computer-controlled dispenser system of claim 1 wherein the control computer monitors the time that the valve is open for the first set of repositories and that the at least one pump pumps for the second set of repositories and continuously operates to self-calibrate based upon an amount of fluid and viscous components output by the dispensing nozzle as measured by the scale.

7. The computer-controlled dispenser system of claim 6 wherein the control computer further monitors at least one of current ambient temperature, temperature of the fluid component or the viscous component, introduction of a new batch of one of the fluid components or one of the viscous components which may alter dispensing speed, and any unique characteristics of each of the at least one associated valve and each of the at least one pump.

8. The computer-controlled dispenser system of claim 6 wherein the control computer specifically monitors each stroke for each of the at least one pump to predict a position within a stroke so as to selectively disengage each of the at least one pump based upon a position within the stroke to enable accurate dispensing while accommodating uneven dispensing throughout the stroke.

9. Apparatus comprising a non-volatile machine-readable medium storing a program having instructions which when executed by a processor will cause the processor to:

receive instructions for the creation of a first mixture of fluid components and viscous components;

operate at least one pump coupled to at least one set of tubing connected to a first set of repositories for viscous components suitable for combination into different mixtures to dispense each of the viscous components from one of the first set of repositories in turn through a dispensing nozzle into a container;

weigh each of the viscous components to ensure that a dispensed amount is accurate using a scale;

open a valve of at least one associated valve coupled to another at least one set of tubing connected to a second set of repositories for fluid components to dispense each of the fluid components from one of the second set of repositories in turn through the dispensing nozzle into the container;

weigh each of the fluid components to ensure that a dispensed amount is accurate using the scale; and mix the fluid components and the viscous components in the container to create the first mixture.

10. The apparatus of claim 9 further comprising:

a processor; and a memory, wherein the processor and the memory comprise circuits and software for performing the instructions on the storage medium.

11. The machine-readable storage medium of claim 9 wherein the instructions further cause the processor to:

receive second instructions for a second mixture, distinct from that of the first mixture, to be created;

operate a second pump of the at least one pump to pump a viscous component from one of the first set of repositories to be dispensed from a dispensing nozzle according to the second instructions; and open a second valve of the at least one associated valve of the at least one set of tubing connected to one of the second set of repositories to enable a fluid component to be dispensed from the dispensing nozzle according to the second instructions to be combined with the viscous component and thereby create the second mixture.

12. The machine-readable storage medium of claim 11 wherein the instructions further cause the processor to create a plurality of unique mixtures in serial, each with distinct instructions comprising components and relative amounts in the first set of repositories and the second set of repositories.

13. The machine-readable storage medium of claim 9 wherein the fluid component and the viscous component are measured using the scale to ensure that a desired amount of each is dispensed into the container.

14. The machine-readable storage medium of claim 13 wherein, when one of the fluid component and the viscous component is over dispensed, the control computer operates to cause an additional amount of another of the fluid component and the viscous component to dispense to cause the first mixture to be appropriately proportioned.

15. The machine-readable storage medium of claim 9 wherein the instructions further cause the processor to monitor the time that the valve is open for the second set of repositories and that the at least one pump pumps for the first set of repositories and to continuously self-calibrate as fluid components and viscous components based upon an amount of fluid and viscous components output by the dispensing nozzle as measured by the scale.

16. The machine-readable storage medium of claim 15 wherein the instructions further cause the processor to monitor at least one of current ambient temperature, temperature of the fluid component or the viscous component, introduction of a new batch of one of the fluid components or one of the viscous components which may alter dispensing speed, and any unique characteristics of each of the at least one associated valve and each of the at least one electrically operated pump.

17. The machine-readable storage medium of claim 15 wherein the instructions further cause the processor to monitor each stroke for each of the at least one pump to predict a position within a stroke so as to selectively disengage each of the at least one pump based upon a position within the stroke to enable accurate dispensing while accommodating uneven dispensing throughout the stroke.

18. A method for operating a computer-controlled dispenser system, the method comprising:

receiving instructions for the creation of a first mixture of fluid components and viscous components;

operating at least one pump coupled to at least one set of tubing connected to a first set of repositories for viscous components suitable for combination into different mixtures to dispense each of the viscous components from one of the first set of repositories in turn through a dispensing nozzle into a container;

weighing each of the viscous components to ensure that a dispensed amount is accurate using a scale;

opening a valve of at least one associated valve coupled to another at least one set of tubing connected to a second set of repositories for fluid components to dispense each of the fluid components from one of the second set of repositories in turn through the dispensing nozzle into the container;

weighing each of the fluid components to ensure that a dispensed amount is accurate using the scale; and mixing the fluid components and the viscous components in the container to create the first mixture.

19. The method of claim 18 wherein further comprising monitoring the time that the valve is open for the second set of repositories and that the at least one pump pumps for the first set of repositories and continuously operating to self-calibrate as fluid components and viscous components based upon an amount of fluid and viscous components output by the dispensing nozzle as measured by the scale.

20. The method of claim 18 further comprising monitoring each stroke for each of the at least one pump to predict a position within a stroke so as to selectively disengage each of the at least one pump based upon a position within the stroke to enable accurate dispensing while accommodating uneven dispensing throughout the stroke.

* * * * *